(12) United States Patent
Yu et al.

(10) Patent No.: US 6,734,930 B2
(45) Date of Patent: May 11, 2004

(54) STRUCTURE OF ORGANIC LIGHT-EMITTING TFT LCD AND METHOD OF MAKING THE SAME

(75) Inventors: Zon-Zer Yu, Taipei (TW); Dong-Yuan Goang, Chung Li (TW); Huang-Chung Cheng, Hsinchu (TW)

(73) Assignee: Allied Material Corp., Ping-Chen (TW)

( * ) Notice: Subject to any disclaimer, the term of this patent is extended or adjusted under 35 U.S.C. 154(b) by 52 days.

(21) Appl. No.: 10/164,699

(22) Filed: Jun. 10, 2002

(65) Prior Publication Data
US 2003/0227582 A1 Dec. 11, 2003

(51) Int. Cl.⁷ .............................................. G02F 1/1335
(52) U.S. Cl. .................... 349/69; 349/122; 349/106; 257/88; 257/98
(58) Field of Search ................... 349/69, 71, 122, 349/106; 257/79, 88, 89, 98

(56) References Cited

U.S. PATENT DOCUMENTS

| | | | | | |
|---|---|---|---|---|---|
| 5,504,599 A | * | 4/1996 | Okibayashi et al. | .......... | 349/69 |
| 5,796,509 A | * | 8/1998 | Doany et al. | ................ | 359/254 |
| 5,926,239 A | * | 7/1999 | Kumar et al. | .................. | 349/69 |
| 5,998,805 A | * | 12/1999 | Shi et al. | ...................... | 257/40 |
| 6,194,837 B1 | * | 2/2001 | Ozawa | ...................... | 315/169.1 |
| 6,441,551 B1 | * | 8/2002 | Abe et al. | ..................... | 313/503 |
| 6,556,260 B1 | * | 4/2003 | Itou et al. | ...................... | 349/69 |
| 6,628,068 B1 | * | 9/2003 | Rorison et al. | ............. | 313/504 |
| 2002/0196387 A1 | * | 12/2002 | Kimura | ........................ | 349/61 |
| 2003/0063231 A1 | * | 4/2003 | Dai et al. | ...................... | 349/61 |
| 2003/0127656 A1 | * | 7/2003 | Aizawa et al. | ................ | 257/79 |

FOREIGN PATENT DOCUMENTS

| JP | 2001133761 A | * | 5/2001 | ......... G02F/1/1333 |
|---|---|---|---|---|
| JP | 2002196688 A | * | 7/2002 | ............. G09F/9/00 |

* cited by examiner

Primary Examiner—Kenneth Parker

(57) ABSTRACT

A structure of an organic light-emitting TFT LCD and the method for making the same are disclosed. The invention provides a glass substrate on which a TFT IC is formed. A metal layer forms the top layer of the TFT. Afterwards, a white light-emitting organic material layer is deposited thereon. A cover layer is then used to flatten the surface of the organic material layer. Finally, a photo mask pattern and a color filter plate are formed, completing the assembly of the TFT LCD.

16 Claims, 3 Drawing Sheets

STRUCTURE OF ORGANIC LIGHT-EMITTING TFT LCD AND METHOD OF MAKING THE SAME

BACKGROUND OF THE INVENTION

1. Field of Invention

The invention relates to the structure of a TFT (Thin Film Transistor) LCD (Liquid Crystal Display) and the method for making the same. More particularly, the invention relates to the structure of an organic light-emitting TFT LCD and the method for making the same.

2. Related Art

The light-emitting methods in the existing TFT LCD's can be classified as active and passive ones. Early light-emitting methods are all passive. A backlight source is used at the back of a glass substrate as the light source. A TFT IC (Integrated Circuit) on the glass substrate is used to control the liquid crystal layer between the glass substrate and a transparent conductive glass, so that the liquid crystal layer becomes transparent or opaque. Afterwards, the light passing through the liquid crystal layer is further filtered by color filter plates so that the emitted light can be red, green or blue. Through signal processing, light beams of three different colors are mixed to produce colorful images. This kind of passive light-emitting methods requires the use of a backlight source and the opening of the LCD has to be adjusted to obtain better light intensity.

With continuous researches and development in light-emitting materials, using light-emitting materials as the light sources of TFT LCD's becomes the trend in modern technologies. Using white light-emitting organic materials as the light source in the TFT LCD and using the TFT to control the white light-emitting material or the driving circuit for providing a voltage to the white light-emitting material can easily control the bright spots on the LCD. Along with color filters as color modulating tools, the structure and manufacturing method for TFT LCD's can be greatly simplified.

Therefore, it is desirable to have a new structure of TFT LCD, which uses a white light-emitting organic material as the light source of the LCD and produces colorful images using the combination of a photo mask pattern and color filters. Furthermore, a manufacturing method for making the above-mentioned light source is proposed to more effectively assemble the LCD'S.

SUMMARY OF THE INVENTION

The invention provides a structure of an organic material TFT LCD. The invention uses a white light-emitting organic material layer as the light source of the LCD. A transparent conductive glass pattern layer and a mask pattern layer are directly formed on top of the light-emitting layer. White light passes through color filters to produce color spots.

The invention provides the structure of an organic TFT LCD. The invention uses a white light-emitting organic material layer as the light source of the LCD. A cover layer is formed on the white light-emitting organic material layer to provide a planar surface. A transparent conductive glass pattern layer is then directly formed on the cover layer.

The invention provides the structure of an organic TFT LCD. The invention uses a white light-emitting organic material layer as the light source of the LCD. A cover layer is formed on the transparent conductive glass pattern layer, and a photo mask pattern layer and color filters are directly formed on top of the cover layer.

The invention provides a manufacturing method for an organic TFT LCD. A TFT is directly covered with a metal layer. A white light-emitting organic material layer is then deposited on the metal layer and a glass substrate as the light-emitting layer of the LCD. The TFT controls the light emission of the light-emitting material.

The invention provides a manufacturing method for an organic TFT LCD. A white light-emitting organic material layer is covered with a planar film layer. The planar film layer is then directly formed with a transparent conductive glass pattern layer. This then completes the assembly of the LCD.

The invention provides a manufacturing method for an organic TFT LCD. A transparent conductive glass pattern layer is deposited with a cover layer to obtain a planar surface, which is then covered with a photo mask pattern layer and color filters.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

This specification discloses a TFT (Thin Film Transistor) LCD (Liquid Crystal Display) structure with an organic light-emitting material. The structure contains a glass substrate as the base of the TFT LCD. The glass substrate is formed with a TFT IC (Integrated Circuit) as the control circuit of the LCD. A metal layer is formed on the top surface of the TFT's. Afterwards, a white light-emitting organic material layer is covers the metal layer and the glass substrate as the light source of the LCD. A first cover layer covers the white light-emitting material layer, forming a planar surface. A transparent conductive glass pattern layer is defined on the first cover layer surface. A mask pattern layer is directly formed at the opening of the transparent conductive glass pattern layer. Alternatively, a second cover layer can be deposited on the transparent conductive glass pattern layer and the first cover layer. A mask pattern layer is then defined on the second cover layer above the transparent conductive glass pattern layer. Finally, color filters are formed on the top, each of the color filters corresponding to a TFT to provide a color spot.

The invention also discloses a manufacturing method for a TFT LCD with an organic light-emitting material. A glass substrate is provided as the base of the LCD. A TFT IC is defined on the surface of the glass substrate. The top of the TFT's is covered by a metal layer as a metal conductive layer. Afterwards, a white light-emitting organic material layer is deposited on the metal layer and the glass substrate as the light source of the LCD. A first cover layer is then deposited on the white light emitting organic material layer, forming a planarized surface. A transparent conductive glass pattern layer is subsequently defined on the surface of the first cover layer above the TFT's. The opening of the transparent conductive glass pattern layer is formed with a mask pattern layer, or deposited with a second cover layer first, forming a planarized surface on the transparent conductive glass pattern layer, and then a mask pattern layer. According to the invention, the mask pattern layer directly fills or covers the openings on the transparent conductive glass pattern layer. Finally, color filters consisting of a red filter, a green filter, and a blue filter are formed. Each color filter corresponds to a TFT to control color spots.

Figure 1:
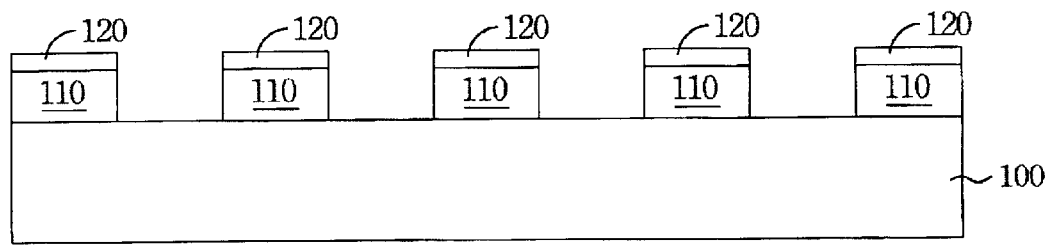
FIG. 1 is a schematic cross-sectional view of the disclosed LCD, where a glass substrate is formed with a TFT IC that is further covered by a metal material.

In the following paragraphs, we use FIGS. 1 to 2 along with FIGS. 4A and 4B to explain the first embodiment of the invention. With reference to FIG. 1, a glass substrate 100 is provided as the base of a TFT LCD. The surface of the glass substrate 100 is then formed with a plurality of TFT's 120, forming a TFT IC as the control circuit of the LCD. The plurality of TFT's 120 partially covers the glass substrate 100. In particular, the manufacturing method of the TFT's 120 is the usual semiconductor process.

With further reference to FIG. 1, a conductive metal material is deposited on the TFT's 120 and the glass substrate 100. The photolithographic and etching technologies are employed to remove the metal material on the glass substrate 100, forming a metal layer 120 on the TFT's 110. The TFT's 110 impose a voltage on the white light-emitting organic material of the LCD through the metal layer 120, thereby controlling the light emission of the white light-emitting organic material.

Figure 2:
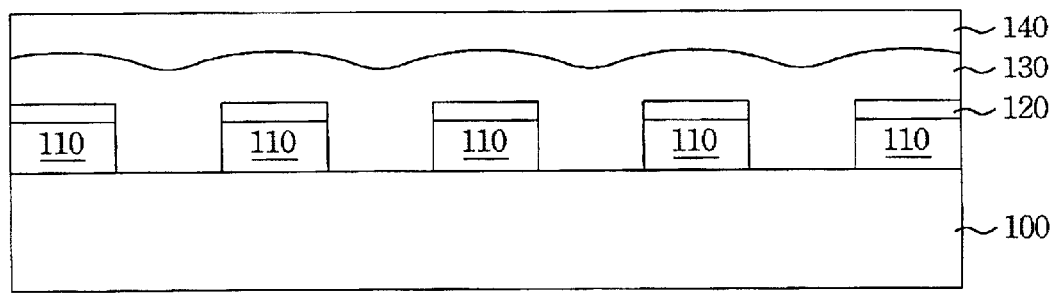
FIG. 2 is a schematic cross-sectional view of the disclosed LCD, where the TFT IC is covered with an organic white-light diode and a film layer is used to perform planarization process on the organic white-light diode.

As shown in FIG. 2, a white light-emitting organic material layer 130 is formed on the metal layer 120 and the glass substrate 100 as the light-emitting material of the LCD. The material of the white light-emitting organic material layer 130 is a white light LED (Light-Emitting Diode) organic material. When the TFT's 110 impose a voltage on this kind of material, white light is emitted. After depositing the white light-emitting organic material layer 130, a first cover layer 140 is deposited upon the white light-emitting organic material layer 130, forming a planarized surface. According to a preferred embodiment, the first cover layer 140 consists of Polyimide, Acrylize, or transparent photoresist to achieve the planarization. In yet another embodiment of the invention, the first cover layer 140 consists of silicon nitride. After the silicon nitride is deposited on the white light-emitting organic material layer 130, a CMP (Chemical Machine Polishing) is employed to planarize the silicon nitride to obtain a flat surface for subsequent processes.

Figure 3:
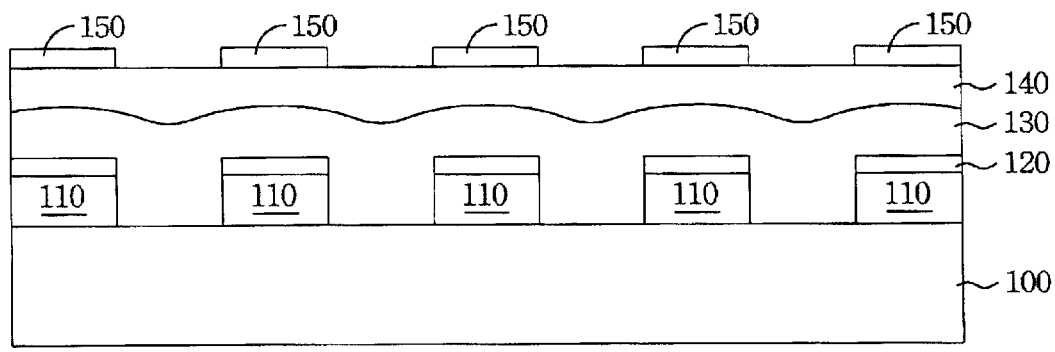
FIG. 3 is a schematic cross-sectional view of the disclosed LCD, where a film layer is formed with a transparent conductive glass layer that is aligned with the TFT IC.

With reference to FIG. 3, a transparent conductive glass is deposited on top of the first cover layer 140. Afterwards, the photolithographic and etching technologies are employed to remove the transparent conductive glass that is not on the TFT's 110, forming a transparent conductive glass pattern layer 150. The transparent conductive glass pattern layer 150 is aligned with the TFT's 110. When the TFT's 110 impose a voltage through the metal layer 120 on the white light-emitting conductive material layer 140, the white light passes through the transparent conductive glass pattern layer 150 and reaches color filters. In the invention, the transparent conductive glass pattern layer 150 can connect to another electrode of the white light-emitting organic material layer 140 to finish the circuit connection.

Figure 4A:
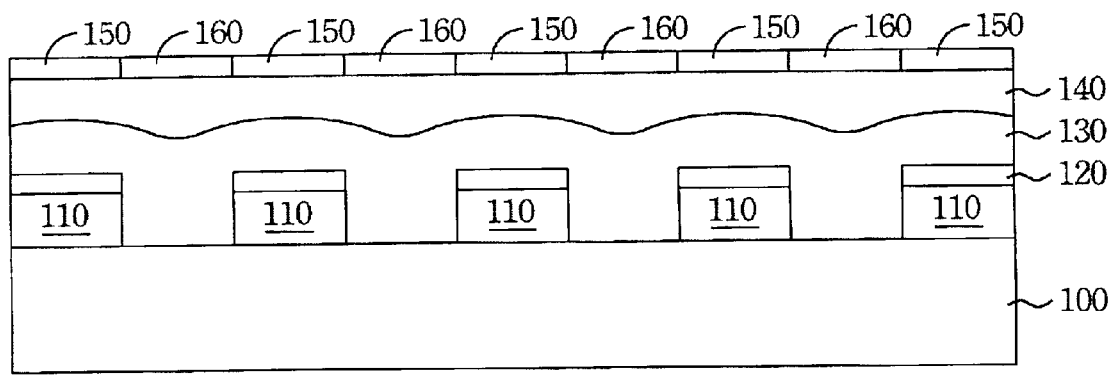
FIG. 4A is a schematic cross-sectional view of the LCD structure in a first embodiment of the invention, where a mask pattern is formed at the opening of a conductive transparent glass layer as the mask layer between different color spots.

As shown in FIG. 4A, a photo mask material is deposited on the first cover layer 140 and the transparent conductive glass pattern layer 150. The photolithographic and etching technologies are employed to remove the photo mask material on the transparent conductive glass pattern layer 150, forming a mask pattern layer 160. The mask pattern layer 160 fills the openings in the transparent conductive glass pattern layer 150, defining the bright positions of the LCD and avoiding the mixture of spots with different colors.

Figure 4B:
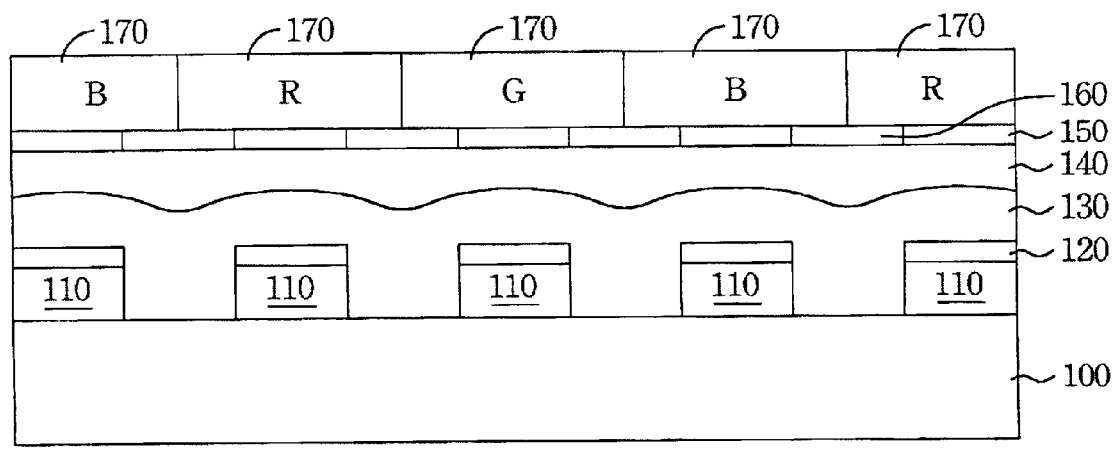
FIG. 4B is a schematic cross-sectional view of the LCD structure in a first embodiment of the invention, where between a transparent conductive glass layer and a mask pattern is formed in order a red filter, a green filter, and a blue filter to modulate the color of light coming out of an organic white-light LED.

With reference to FIG. 4B, color filters 170 are formed on the mask pattern layer 160 and the transparent conductive glass pattern layer 150. When the whit light-emitting organic material layer 130 sends out white light, it passes through the transparent conductive glass pattern layer 150 and reaches the color filters 170. The white light is converted into red, blue and green light here. The intensities of different colors are modulated to make desired color images. The color filters 170 consist of a red filter, a green filter, and a blue filter arranged in order on the mask pattern layer 160 and the transparent conductive glass pattern layer. Each TFT 110 corresponds to one of the color filters (red, green or blue).

Figure 5A:
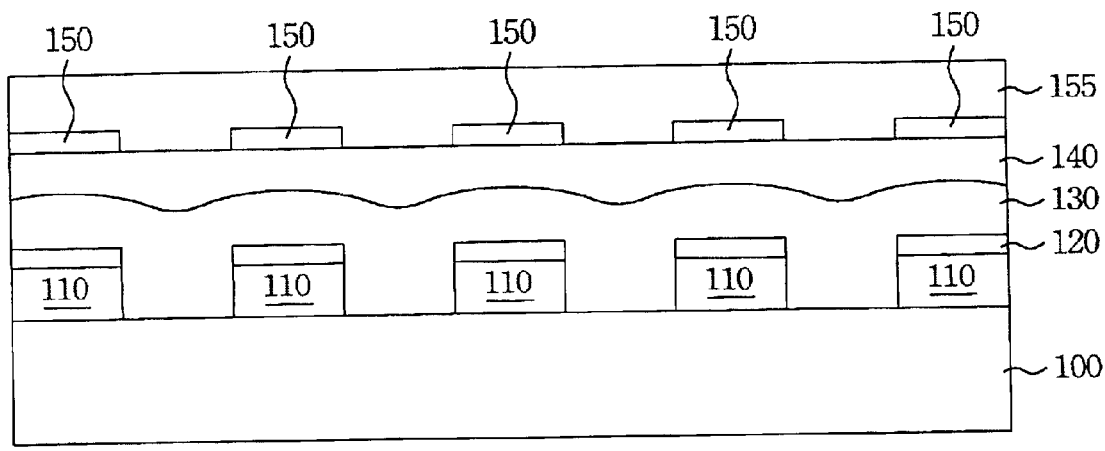
FIG. 5A is a schematic cross-sectional view of the LCD structure in a second embodiment of the invention, where a transparent conductive glass layer is covered with a planar film layer to perform planarization on the transparent conductive glass layer.
Figure 5B:
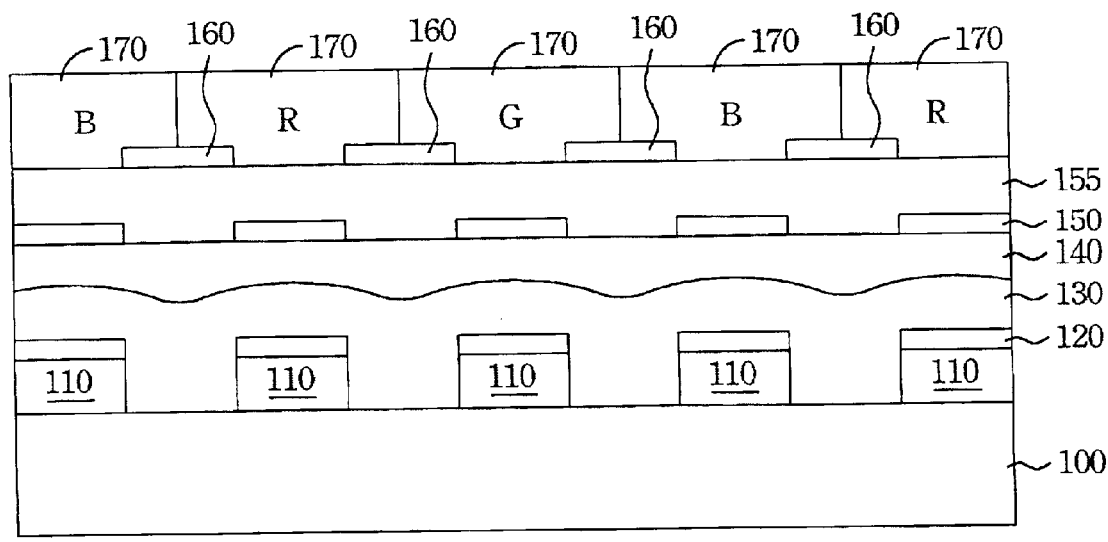
FIG. 5B is a schematic cross-sectional view of the LCD structure in a second embodiment of the invention, where a planar film layer is formed with a mask pattern layer as the barrier between different color spots, and a red filter, a green filter and a blue filter are formed in order for modulating the white light emitted from an organic white-light LED.

We will use FIGS. 1 through 3 along with FIGS. 5A and 5B to explain a second embodiment of the invention. As shown in FIGS. 1 through 3, a glass substrate 100 is formed with TFT's 110, on top of which is formed with a metal layer 120. Afterwards, a white light-emitting organic material layer 130 and a first cover layer 140 are deposited and the surface of the first cover layer 140 is defined with a transparent conductive glass pattern layer 150. The details are the same as in the first embodiment and therefore are not repeated herein.

With reference to FIG. 5A, after defining the transparent conductive glass pattern layer 150 a second cover layer 155 is deposited on the transparent conductive glass pattern layer 150 and the first cover layer 140, forming a planarized surface. In a preferred embodiment of the invention, the second cover layer 155 consists of Polyimide, Acrylize, or transparent photoresist. In another embodiment, the second cover layer 155 uses silicon nitride. After the silicon nitride is deposited, a CMP (Chemical Machine Polishing) is employed to planarize the silicon nitride to obtain a flat surface for subsequent processes.

As shown in FIG. 5B, a photo mask material is deposited on the second cover layer 155. The photolithographic and etching technologies are then employed to remove the photo mask material, forming a mask pattern layer 160 on the second cover layer 155. The mask pattern layer 160 is formed on the openings of the transparent conductive glass pattern layer 150, without blocking the white light emitted out of the transparent conductive glass pattern layer 150. Once the mask pattern layer 160 is defined, color filters 170 are formed on top of the mask pattern layer 160 and the second cover layer 155. The color filters 170 consist of a red filter, a green filter, and a blue filter arranged in order on the second cover layer 155. Each TFT 110 is aligned with one of the color filters (red, green or blue) so that each TFT 110 produces a color spot.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A structure of the TFT (Thin Film Transistor) LCD (Liquid Crystal Display) with an organic light-emitting material, which comprises:
    a glass substrate;
    a plurality of TFT's formed on the top surface of the glass substrate as the control circuit of the LCD;
    a metal layer covering the top surface of the plurality of TFT's;
    a white light-emitting organic material layer covering the metal layer and the glass substrate;
    a cover layer formed on the white light-emitting organic material layer to form a planarized film layer;
    a transparent conductive glass pattern layer formed on the cover layer to cover the plurality of TFT's only;
    a mask pattern layer formed on the cover layer and filling the openings on the transparent conductive glass layer; and
    color filters formed on the transparent conductive glass pattern layer and the mask pattern layer for performing color modulations on the white light emitted by the white light-emitting organic material layer.

2. The LCD structure of claim 1, wherein the metal layer consists of a conductive metal material.

3. The LCD structure of claim 1, wherein the white light-emitting organic material is a white LED (Light-Emitting Diode) organic material.

4. The LCD structure of claim 1, wherein the cover layer consists of a material selected from the group consisting of Polyimide, Acrylize and transparent photoresist.

5. The LCD structure of claim 1, wherein the cover layer consists of silicon nitride and its surface is planarized through a CMP (Chemical Machine Polishing).

6. The LCD structure of claim 1, wherein the transparent conductive glass layer consists of ITO.

7. The LCD structure of claim 1, wherein the color filters consist of a red filter, a green filter, and a blue filter.

8. A structure of the TFT LCD with an organic light-emitting material, which comprises:
    a glass substrate;
    a plurality of TFT's formed on the top surface of the glass substrate as the control circuit of the LCD;
    a metal layer covering the top surface of the plurality of TFT's;
    a white light-emitting organic material layer covering the metal layer and the glass substrate;
    a first cover layer formed on the white light-emitting organic material layer to form a planarized film layer;
    a transparent conductive glass pattern layer formed on the cover layer to cover the plurality of TFT's only;
    a second cover layer formed on the first cover layer and the transparent conductive glass layer;
    a mask pattern layer formed on the second cover layer; and
    color filters formed on the second cover layer and the mask pattern layer for performing color modulations on the white light emitted by the white light-emitting organic material layer.

9. The LCD structure of claim 8, wherein the metal layer consists of a conductive metal material.

10. The LCD structure of claim 8, wherein the white light-emitting organic material is a white LED (Light-Emitting Diode) organic material.

11. The LCD structure of claim 8, wherein the first cover layer consists of a material selected from the group consisting of Polyimide, Acrylize and transparent photoresist.

12. The LCD structure of claim 8, wherein the first cover layer consists of silicon nitride and its surface is planarized through a CMP (Chemical Machine Polishing).

13. The LCD structure of claim 8, wherein the transparent conductive glass layer consists of ITO.

14. The LCD structure of claim 8, wherein the second cover layer consists of a material selected from the group consisting of Polyimide, Acrylize and transparent photoresist.

15. The LCD structure of claim 8, wherein the second cover layer consists of silicon nitride and its surface is planarized through a CMP (Chemical Machine Polishing).

16. The LCD structure of claim 8, wherein the color filters consist of a red filter, a green filter, and a blue filter.

* * * * *